US007175804B2

(12) United States Patent
Yoshikawa et al.

(10) Patent No.: US 7,175,804 B2
(45) Date of Patent: Feb. 13, 2007

(54) SN-ZN LEAD-FREE SOLDER ALLOY, AND SOLDER JUNCTION PORTION

(75) Inventors: Masaaki Yoshikawa, Sagamihara (JP); Haruo Aoyama, Sagamihara (JP); Hirotaka Tanaka, Sagamihara (JP)

(73) Assignee: Nippon Metal Industry Co., Ltd., Tokyo (JP)

( * ) Notice: Subject to any disclaimer, the term of this patent is extended or adjusted under 35 U.S.C. 154(b) by 0 days.

(21) Appl. No.: 11/433,325

(22) Filed: May 12, 2006

(65) Prior Publication Data
US 2006/0204397 A1   Sep. 14, 2006

Related U.S. Application Data

(62) Division of application No. 10/468,606, filed as application No. PCT/JP02/11989 on Nov. 18, 2002, now Pat. No. 7,070,736.

(30) Foreign Application Priority Data
Aug. 23, 2002   (JP)   ............................. 2002-242812

(51) Int. Cl.
*B23K 35/26* (2006.01)
*B23K 20/04* (2006.01)

(52) U.S. Cl. ...................... 420/557; 148/400

(58) Field of Classification Search ................ 420/557; 148/400
See application file for complete search history.

(56) References Cited

U.S. PATENT DOCUMENTS 6,080,497 A * 6/2000 Carey et al. ................ 428/647

FOREIGN PATENT DOCUMENTS

| JP | 2000-15478 | | 1/2000 |
| JP | 2000015478 | * | 1/2000 |
| JP | 2000-210788 | | 8/2000 |
| JP | 2002-248596 | | 9/2002 |
| JP | 2002-283093 | | 10/2002 |

* cited by examiner

Primary Examiner—Sikyin Ip

(57) ABSTRACT

An Sn—Zn lead-free solder alloy according to the present invention is constructed in a manner such that it is an Sn-based solder alloy indispensably containing 6 to 10 wt % zinc at least and further containing 0.0015 to 0.03 wt % magnesium and 0.0010 to 0.006 wt % aluminum. Upon preservation of solder paste not only under refrigeration but also at a room temperature or higher, the inside of solder particle is protected by the protective magnesium/aluminum oxide film formed on the solder particle surface, and a reaction between zinc and an activator is suppressed, so that preservation stability is improved, and at the elevated temperature during soldering, the solder alloy enters a state where said protective oxide film is easily destroyed, so that good wettability is held.

2 Claims, 1 Drawing Sheet

| SAMPLES | CHEMICAL COMPOSITIONS OF PARTICLE | | | | | REFRIGERATION PRESERVATION STABILITY | PRESERVATION STABILITY AT 40°C | SOLDERABILITY | | | REMARKS |
|---|---|---|---|---|---|---|---|---|---|---|---|
| | Sn % | Zn % | Bi % | Mg ppm | Al ppm | | | ONE DAY LATER | ONE WEEK LATER | UNMELTED SOLDER | |
| A | 91 | 8 | 1 | 17 | 29 | ◎ | ◎ | ◎ | ◎ | ◎ | EXAMPLES OF THE INVENTION |
| B | 91 | 8 | 1 | 47 | 19 | ◎ | ○ | ◎ | ○ | ◎ | |
| C | 91 | 8 | 1 | 88 | 20 | ◎ | ◎ | ◎ | ◎ | ◎ | |
| D | 91 | 8 | 1 | 89 | 40 | ◎ | ◎ | ◎ | ◎ | ◎ | |
| E | 89 | 8 | 3 | 131 | 14 | ◎ | ○ | ◎ | ◎ | ◎ | |
| F | 92 | 7 | 1 | 74 | 35 | ◎ | ◎ | ◎ | ◎ | ◎ | |
| G | 93 | 6 | 1 | 71 | 55 | ◎ | ◎ | ◎ | ◎ | ○ | |
| H | 89 | 8 | 3 | 2 | — | × | × | × | × | ◎ | COMPARISON EXAMPLES |
| I | 91 | 8 | 1 | 272 | 4 | ◎ | × | ◎ | ◎ | ◎ | |
| J | 91 | 8 | 1 | 243 | 67 | ◎ | ◎ | ◎ | ◎ | × | |
| K | 91 | 8 | 1 | 45 | 126 | ◎ | ◎ | ◎ | ◎ | × | |
| L | 91 | 9 | | 1 | — | × | × | × | × | ◎ | |
| M | 89 | 8 | 3 | — | 29 | × | × | ○ | ○ | ◎ | |
| N | 91 | 8 | 1 | — | 128 | ◎ | ◎ | ◎ | ◎ | × | |

FIG. 1

| SAMPLES | CHEMICAL COMPOSITIONS OF PARTICLE | | | | | REFRIGERATION PRESERVATION STABILITY | PRESERVATION STABILITY AT 40°C | SOLDERABILITY | | | REMARKS |
|---|---|---|---|---|---|---|---|---|---|---|---|
| | Sn % | Zn % | Bi % | Mg ppm | Al ppm | | | ONE DAY LATER | ONE WEEK LATER | UNMELTED SOLDER | |
| A | 91 | 8 | 1 | 17 | 29 | ◎ | ◎ | ◎ | ◎ | ◎ | EXAMPLES OF THE INVENTION |
| B | 91 | 8 | 1 | 47 | 19 | ◎ | ○ | ◎ | ○ | ◎ | |
| C | 91 | 8 | 1 | 88 | 20 | ◎ | ◎ | ◎ | ◎ | ◎ | |
| D | 91 | 8 | 1 | 89 | 40 | ◎ | ◎ | ◎ | ◎ | ◎ | |
| E | 89 | 8 | 3 | 131 | 14 | ◎ | ○ | ◎ | ◎ | ◎ | |
| F | 92 | 7 | 1 | 74 | 35 | ◎ | ◎ | ◎ | ◎ | ◎ | |
| G | 93 | 6 | 1 | 71 | 55 | ◎ | ◎ | ◎ | ◎ | ○ | |
| H | 89 | 8 | 3 | 2 | — | × | × | × | × | ◎ | COMPARISON EXAMPLES |
| I | 91 | 8 | 1 | 272 | 4 | ◎ | ◎ | ◎ | ◎ | ◎ | |
| J | 91 | 8 | 1 | 243 | 67 | ◎ | ◎ | ◎ | ◎ | × | |
| K | 91 | 8 | 1 | 45 | 126 | ◎ | ◎ | ◎ | ◎ | × | |
| L | 91 | 9 | | 1 | — | × | × | × | × | ◎ | |
| M | 89 | 8 | 3 | — | 29 | × | × | ○ | ○ | ◎ | |
| N | 91 | 8 | 1 | — | 128 | ◎ | ◎ | ◎ | ◎ | × | |

SN-ZN LEAD-FREE SOLDER ALLOY, AND SOLDER JUNCTION PORTION

REFERENCE TO RELATED APPLICATION

This is a divisional application of Ser. No. 10/468,606, filed Aug. 19, 2003 now U.S. Pat. No. 7,070,736 which is currently allowed. The subject matter of the aforementioned prior application is hereby incorporated herein by reference.

TECHNICAL FIELD

The present invention relates to an Sn—Zn lead-free solder alloy and soldered bond, which have improved environmental safety among various solder materials.

BACKGROUND ART

Hitherto, an Sn—Pb solder alloy has often been used for soldering various apparatuses because it has advantages such that a melting point is low, wettability is good even in an oxidizing atmosphere, and the like. However, since lead has toxicity, in recent years, the realization of a lead-free solder has rapidly been progressed from the viewpoint of prevention of environmental pollution in association with a disposing process or the like of electronic apparatuses. However, since a lead-free solder alloy is inferior to the conventional Sn—Pb solder alloy in terms of the wettability, melting point, costs, and the like, it is not developed yet at present as a perfect substitute.

In a trend such that importance is attached to the environment, the realization of a lead-free solder is an emergency subject also in reflow soldering as one of mounting steps of electronic circuit devices. Therefore, hitherto, an Sn—Zn solder alloy containing about 9 wt % zinc (eutectic composition) has been proposed as a lead-free solder material which is expected to be put into practical use for reflow soldering. Further, an Sn—Zn solder alloy containing about 8 wt % zinc and 1 to 3 wt % bismuth has been also proposed. Those Sn—Zn solder alloys have advantages such that a eutectic temperature of an Sn—Zn alloy is equal to 199° C. closest to a eutectic point of an Sn—Pb alloy among Sn-based lead-free solder alloys, and costs of raw materials of them are lower than that of the other lead-free solder alloys.

Generally, solder paste which is used for the reflow soldering is made of a mixture of solder particle and flux. An activator to clean the surface of a soldering target and improve the wettability of the solder during soldering, has been added to the flux. Therefore, in the Sn—Zn solder alloy which is inferior to the conventional Sn—Pb solder alloy in terms of the wettability, it cannot help enhancing the activator particularly in order to improve the wettability of the solder. Moreover, in the Sn—Zn solder alloy, zinc-riched phases exist on the surface and the inside of the manufactured solder particle.

Therefore, in the conventional Sn—Zn lead-free solder alloy, there are problems such that since zinc is an active element, while the solder paste which is made by mixing the solder particle with the flux is preserved under refrigeration, zinc on the surface of the solder particle reacts easily on the activator in the flux, so that viscosity of the solder paste is rapidly and remarkably increased by its reactive product more than the conventional Sn—Pb solder alloy, and when such a solder paste is used, for example, it is impossible to print onto a printed wiring board, and the like, that is, the preservation stability is low. Furthermore, there is a problem such that when the solder paste is preserved under an environment at a room temperature or higher which is severer than the environment of the refrigeration preservation, since zinc reacts further easily on the activator, the viscosity increases remarkably and the preservation stability further deteriorates.

There is also a problem such that if an activity or an amount of the activator is suppressed in order to prevent an increase in viscosity of the solder paste, a zinc oxide which is produced during soldering cannot be reduced, so that wettability of the solder deteriorates. As mentioned above, hitherto, it is extremely difficult to reconcile the wettability and preservation stability of the solder, and that causes non-spread of the lead-free solder paste which is effective to protect the environment.

As mentioned above, there is an Sn—Zn solder alloy containing bismuth as conventional lead-free solder alloys. In such a kind of solder alloy, there is a tendency such that metallic gloss on the surface of the solder after solidification becomes dim. Therefore, besides the reconciliation between the wettability and the preservation stability, it is also demanded to solve the problem on the external appearance.

Therefore, hitherto, a method of adding another element, for example, aluminum has been disclosed as means for solving the above problems (International Publication No. WO02/34969A1). However, since the method of adding aluminum has a problem of occurrence of an unmelted solder as will be explained herein later, if aluminum or the like is solely added, all of the above conventional problems cannot be solved.

In consideration of the conventional problems as mentioned above, it is an object of the present invention to provide an Sn—Zn lead-free solder alloy and a soldered bond using the same in which wettability of solder is improved and preservation stability of solder paste under refrigeration and at a room temperature or higher is also excellent, and also to improve surface gloss after solidification in the case of an Sn—Zn solder containing bismuth.

DISCLOSURE OF INVENTION

The present inventors have made diligent studies to solve the conventional problems mentioned above, so that they have found out that if predetermined infinitesimal quantities of magnesium and aluminum whose oxidizing tendencies are higher than that of zinc are complexly added to an Sn—Zn solder, a reaction between zinc and flux in solder paste is suppressed, so preservation stability under refrigeration and at a room temperature or higher is improved and, during soldering, good wettability is held, and the present invention has been completed.

That is, according to the present invention, there is provided an Sn—Zn lead-free solder alloy which is an Sn-based solder alloy indispensably containing 6 to 10 wt % zinc at least and further containing 0.0015 to 0.03 wt % magnesium and 0.0010 to 0.006 wt % aluminum. Therefore, according to the present invention, when the solder paste is preserved not only under refrigeration but also at a room temperature or higher, the inside of solder particle is protected by the protective magnesium/aluminum oxide film formed on the surface of solder particle, and a reaction between zinc and an activator is suppressed, so that preservation stability is improved, on the other hand, at the elevated temperature during soldering, the solder enters a state where said protective oxide film is easily destroyed, so that good wettability can be held.

According to the present invention, there is provided an Sn—Zn lead-free solder alloy which is an Sn-based solder alloy indispensably containing 6 to 10 wt % zinc and 0.5 to 6 wt % bismuth at least and further containing 0.0015 to 0.03 wt % magnesium and 0.0010 to 0.006 wt % aluminum. Therefore, according to the present invention, in the case of the Sn—Zn lead-free solder containing bismuth, both of the good wettability and good preservation stability of the solder, described above, are also realized and unevenness of the solder surface is reduced upon solidification, so that the surface gloss can be further improved.

Further, according to the present invention, an Sn—Zn lead-free soldered bond which is bonded by the solder alloy constructed as mentioned above is provided.

BRIEF DESCRIPTION OF DRAWINGS

FIG. 1 is a table showing chemical compositions of solder particle and results of evaluation for characteristics in experiments of an Sn—Zn lead-free solder alloy of the present invention.

BEST MODE FOR CARRYING OUT THE INVENTION

An embodiment of the invention will be described further in detail hereinbelow with reference to the drawing.

In an Sn—Zn lead-free solder, as is well-known, for example, solder particle and a flux which have previously been prepared are stirred and mixed so as to obtain paste-like solder. In this case, however, zinc whose affinity with oxygen is large cannot help becoming an oxide on the surface of the solder particle. Therefore, if the solder particle is mixed with the flux so as to obtain solder paste, viscosity of the solder paste increases due to a reaction between zinc and an activator in the flux, so that a problem about preservation stability occurs. On the other hand, even if an activity or an amount of the activator is suppressed in order to prevent an increase in viscosity, a zinc oxide which is produced during soldering cannot be reduced, so that a deterioration of the wettability of the solder occurs.

Therefore, in the present invention, only an infinitesimal quantity of element whose oxidizing tendency is higher than that of zinc is added to the Sn—Zn solder, so that since the added element is oxidized preferentially to zinc, a protective film of the oxide of added element is formed on the surface of the solder particle, thereby suppressing the reaction between zinc and the flux by the protective oxide film. By this method, it is intended to obtain the solder particle for the solder paste which is excellent in both of the wettability and the preservation stability. However, although it depends on an amount of added element, the protective oxide film such as aluminum oxide film which is formed on the surface is too strong to be reduced by the flux, so that there is a case where, on the contrary, a large amount of unmelted solder occurs during soldering.

On the basis of above-mentioned consideration, according to the present invention, first, magnesium is selected and used as an essential additional element among various elements whose oxidizing tendency is higher than that of zinc. The addition of magnesium has the following effects: it is possible to obtain the particle for the Sn—Zn solder paste in which both of the wettability and the preservation stability are excellent as mentioned above; and an amount of unmelted solder is small unlike other additional element such as aluminum or the like. In the present invention, a reason why the reaction between zinc and the flux is suppressed upon preservation of the solder paste and an amount of unmelted solder is small, is as follows. It is because while the protective film of the magnesium oxide which is formed on the surface of the solder particle protects the inside of the solder during preservation of it under refrigeration, at the elevated temperature during soldering, said protective magnesium oxide film is in a state where it is easily destroyed in order to hold good wettability.

As mentioned above, in the Sn—Zn solder alloy, even by adding only magnesium, the high preservation stability can be assured upon preservation under refrigeration. However, in the case of preserving the same solder paste under the environment at a room temperature or higher which is severer than that of refrigeration preservation, since zinc further easily reacts on the activator, the sufficient preservation stability cannot be always assured.

Therefore, the present inventors examined a complex addition of magnesium and other various elements, so that it has been found that by subsequently selecting aluminum as an essential additional element among various elements whose oxidizing tendencies are higher than that of zinc and mixedly adding small amount of aluminum, while the good wettability of the solder is held, the high preservation stability is held not only upon preservation under refrigeration but also upon preservation at a room temperature or higher. That is, the protective magnesium/aluminum oxide film which is formed on the surface of the solder particle protects the inside of solder and holds the high preservation stability upon preservation of the solder paste both under refrigeration and at a room temperature or higher. On the other hand, at the elevated temperature during soldering, the solder enters a state where said protective oxide film is easily destroyed, thereby holding the good wettability. Moreover, it has been found that by limiting an amount of aluminum added to a predetermined amount, the occurrence of the unmelted solder as a drawback of the aluminum added alloy can be also suppressed to a level which does not cause a problem on the practical use.

Therefore, according to the present invention, in order to suppress the reaction between zinc and the activator in the flux and improve the preservation stability upon preservation of the solder paste both under refrigeration and at a room temperature or higher and, on the other hand, in order to hold the good wettability during soldering, there is provided the Sn—Zn lead-free solder alloy constructed in a manner such that it is an Sn-based solder alloy indispensably containing 6 to 10 wt % zinc at least and further containing 0.0015 to 0.3 wt % magnesium and 0.0010 to 0.006 wt % aluminum.

Magnesium has the following other effects. That is, in the case of the Sn—Zn solder alloy containing bismuth, there is a tendency such that the metallic gloss on the surface of the solder becomes dim. However, it has been confirmed that if a small amount of magnesium is added to the Sn—Zn solder alloy containing bismuth, the surface gloss is improved. This is because if bismuth is added, fine unevenness are formed on the surface upon solidification, but by adding magnesium, an unevenness on the solder surface is reduced upon solidification. Thus, the surface with good gloss close to that of the conventional Sn—Pb solder can be obtained.

Therefore, according to the present invention, in order to improve the preservation stability of the solder paste both under refrigeration and at a room temperature or higher, hold the good wettability of the solder, and obtain the good surface gloss, the Sn—Zn lead-free solder alloy can be also constructed in a manner such that it is an Sn-based solder alloy indispensably containing 6 to 10 wt % zinc and 0.5 to 6 wt % bismuth at least and further containing 0.0015 to 0.03 wt % magnesium and 0.0010 to 0.006 wt % aluminum.

Subsequently, reasons why the ranges of magnesium and aluminum contents are specified as mentioned above in the Sn—Zn lead-free solder alloy of the present invention will be described. First, a lower limit of magnesium content is set to 0.0015 wt % as a content necessary for obtaining the effect of magnesium on the basis of results of experiments. This is because if it is less than 0.0015 wt %, the oxide film which is sufficient to reduce the reaction between zinc and the activator is not formed on the particle surface, so that the inside of solder particle cannot be protected against the oxidization and, consequently, the good wettability and preservation stability cannot be obtained.

An upper limit of magnesium content is set to 0.03 wt % in consideration of deterioration of solderability. This is because if it exceeds 0.03 wt %, the magnesium oxide is not destroyed but remains or the unmelted solder occurs during soldering.

Subsequently, a lower limit of aluminum content is similarly set to 0.0010 wt % in consideration of the results of the experiments. This is because if it is less than 0.0010 wt %, a sufficient oxide film is not formed on the particle surface and the high preservation stability cannot be obtained. An upper limit of aluminum content is set to 0.006 wt %. This is because if it exceeds 0.006 wt %, the unmelted solder often occurs during soldering. As mentioned above, only by specifying the upper and lower limits of the contents of magnesium and aluminum, respectively, the good surface gloss is not lost and the reaction between zinc and the activator in the flux is suppressed and the preservation stability under refrigeration and the preservation stability at a room temperature or higher are improved by the protective oxide film formed on the solder particle surface. During soldering, the protective oxide film is destroyed and good wettability is assured.

According to the present invention, the soldered bond of the Sn—Zn lead-free solder is formed by using the solder alloy constructed as mentioned above.

Although the solder alloy adjusted by the foregoing chemical compositions has been described with respect to the example in which it has been processed to the solder particle in the above embodiment, naturally, it can be processed to a wire solder and used as necessary.

EMBODIMENT

Although the present invention will be further specifically explained on the basis of the following embodiment, the present invention is not limited to this embodiment.

The present inventors made experiments in order to confirm the effects of the present invention. In the experiments of this embodiment, Sn-based solder particle in which, a content of zinc is within a range of 6 to 9%, a content of bismuth is within a range of 0 to 3%, a content of magnesium is within a range of 0~0.0272%, and a content of aluminum is within a range of 0~0.0128% was used. The solder particle used in the experiments is powder of an Sn—Zn based alloy having spherical particle whose size is 32 to 45 μm in diameter. Chemical compositions of those particle and their characteristics evaluation results are shown in FIG. 1. The solder particle is mixed with the flux so as to obtain a paste and used for various evaluation experiments. Solderability in FIG. 1 was measured by a method according to JIS-Z-3284 and wettability was evaluated. The experiments were performed by preheating at 150° C. for 0 to 3.5 minutes in the atmosphere in order to simulate conditions in a wider range. As results of the experiments, a paste in which wettability is defective is shown by "x", a paste in which it is good is shown by "o", and a paste in which it is very good is shown by "⊚". With respect to the preservation stability under refrigeration, the solder particle and the flux are mixed, thereafter, the mixture is preserved for one week in a refrigerator held at about 4° C., and samples are evaluated on the basis of a degree of increase in viscosity and printability of resultant pastes. With respect to the preservation stability at 40° C., the solder particle and the flux are mixed, thereafter, the mixture is preserved for 24 hours in a constant temperature chamber held at about 40° C., and samples are evaluated on the basis of a degree of increase in viscosity and printability of resultant pastes. With respect to the preservation stability under refrigeration and the preservation stability at 40° C., in a manner similar to the wettability, a defective paste is shown by "x", a good paste is shown by "o", and a very good paste is shown by "⊚". As shown in FIG. 1, it has been confirmed that both of the wettability, the preservation stability under refrigeration, and the preservation stability at 40° C. of the pastes using the solder particle according to the present invention are excellent.

INDUSTRIAL APPLICABILITY

As mentioned above, among various solder materials, the solder materials according to the present invention are suitable for use in a mounting step of electronic circuit devices or the like, and particularly useful as an Sn—Zn lead-free solder alloy and a soldered bond which have improved environment safety.

The invention claimed is:

1. A lead-free solder alloy consisting of the following components based on the total weight of the alloy:
   6 to 10 wt % of zinc (Zn);
   0.5 to 6 wt % of bismuth (Bi);
   0.0015 to 0.03 wt % of magnesium (Mg);
   0.0010 to 0.006 wt % of aluminum (Al)
   and the balance tin (Sn) to total 100 wt % of the alloy.

2. A soldered bond comprising the solder alloy of claim 1.